United States Patent
Kawashima et al.

(10) Patent No.: US 8,420,188 B2
(45) Date of Patent: Apr. 16, 2013

(54) RESIN MEMBER FITTING STRUCTURE AND PASSENGER COMPARTMENT ANTENNA DEVICE

(75) Inventors: Masaki Kawashima, Aichi (JP); Shinji Hasegawa, Aichi (JP); Giko Makino, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 788 days.

(21) Appl. No.: 12/337,730

(22) Filed: Dec. 18, 2008

(65) Prior Publication Data

US 2009/0162581 A1   Jun. 25, 2009

(30) Foreign Application Priority Data

Dec. 19, 2007  (JP) ................................ 2007-327738

(51) Int. Cl.
*F16B 5/07*  (2006.01)
*H04B 1/034*  (2006.01)
*H01Q 1/32*  (2006.01)

(52) U.S. Cl.
USPC ............ 428/33; 343/713; 343/787; 343/788; 343/866; 343/893; 455/347; 340/5.64

(58) Field of Classification Search ........... 138/DIG. 11; 24/614, 615, 625; 428/33; 206/1.5, 37, 13.5, 206/305, 37.3; 439/296, 327, 328, 345, 346, 439/363, 367, 383, 385; 343/713, 787, 788, 343/866, 893, 895
See application file for complete search history.

(56) References Cited

U.S. PATENT DOCUMENTS

| | | | | |
|---|---|---|---|---|
| 5,206,796 A | * | 4/1993 | Thompson et al. | 361/818 |
| 7,394,353 B2 | * | 7/2008 | Schambeck et al. | 340/426.36 |
| 7,427,963 B2 | | 9/2008 | Moriya | |
| D605,662 S | * | 12/2009 | Miura et al. | D15/5 |
| 7,839,655 B2 | * | 11/2010 | Clark | 361/800 |
| 2002/0033777 A1 | * | 3/2002 | Maruyama et al. | 343/713 |

(Continued)

FOREIGN PATENT DOCUMENTS

| | | |
|---|---|---|
| JP | 3-27105 | 3/1991 |
| JP | 03-255225 | 11/1991 |

(Continued)

OTHER PUBLICATIONS

Notice of Allowance, dated Jan. 17, 2012, issued in corresponding Japanese Application No. 2007-327738 (English translation not available).

*Primary Examiner* — Michele L. Jacobson
*Assistant Examiner* — Lee Sanderson
(74) *Attorney, Agent, or Firm* — Saul Ewing LLP (57) ABSTRACT

A resin member fitting structure including a first resin member, which is a rectangular hollow tube, has at least one inner wall surface. A second resin member, which is a hollow or solid rectangular tube, has at least one outer wall surface fitted to the at least one inner wall surface of the first resin member. The inner wall surface of the first resin member and the outer wall surface of the second resin member come into contact with each other and define at least one set of fitting surfaces. The second resin member has a hygroscopic expansion coefficient that is smaller than that of the first resin member. The at least one fitting surface includes a plurality of recess-projection engagement structures spaced apart from each other in a circumferential direction that intersects a longitudinal direction of the first and second resin members.

4 Claims, 8 Drawing Sheets

U.S. PATENT DOCUMENTS

| | | | |
|---|---|---|---|
| 2002/0175096 A1* | 11/2002 | Linihan | 206/305 |
| 2004/0134046 A1* | 7/2004 | Giampavolo | 24/615 |
| 2004/0201451 A1* | 10/2004 | Sugimoto et al. | 340/5.62 |
| 2004/0221432 A1* | 11/2004 | Nezu | 24/614 |
| 2005/0219139 A1* | 10/2005 | Kimura et al. | 343/788 |
| 2006/0023442 A1* | 2/2006 | De Los Santos et al. | 361/814 |
| 2007/0075913 A1* | 4/2007 | Moriya | 343/895 |
| 2007/0139288 A1* | 6/2007 | Shigemoto | 343/788 |

FOREIGN PATENT DOCUMENTS

| | | |
|---|---|---|
| JP | 6-41219 | 5/1994 |
| JP | 7-25136 | 5/1995 |
| JP | 11-131771 | 5/1999 |
| JP | 11-298236 | 10/1999 |
| JP | 2001-332400 | 11/2001 |
| JP | 2004-360835 | 12/2004 |
| JP | 2006-157375 | 6/2006 |
| JP | 2006-180436 | 7/2006 |
| JP | 2006180436 A * | 7/2006 |
| JP | 2007-202071 | 8/2007 |
| JP | 2007-202242 | 8/2007 |
| WO | 2005/038982 A1 | 4/2005 |

* cited by examiner

RESIN MEMBER FITTING STRUCTURE AND PASSENGER COMPARTMENT ANTENNA DEVICE

CROSS-REFERENCE TO RELATED APPLICATIONS

This application is based upon and claims the benefit of priority from prior Japanese Patent Application No. 2007-327738, filed on Dec. 19, 2007, the entire contents of which are incorporated herein by reference.

BACKGROUND OF THE INVENTION

The present invention relates to a resin member fitting structure for fitting together two resin members having different hygroscopic expansion coefficients and to a passenger compartment antenna device including such a resin member fitting structure.

One type of a known electronic key system includes a portable device (electronic key), which is carried by a driver. When the driver carrying the portable device approaches a vehicle door, the door is automatically unlocked. Then, when the driver enters the passenger compartment, the electronic key system enables the starting of the engine. The operation of a typical electronic key system will now be discussed with reference to FIG. 10.

Figure 10:
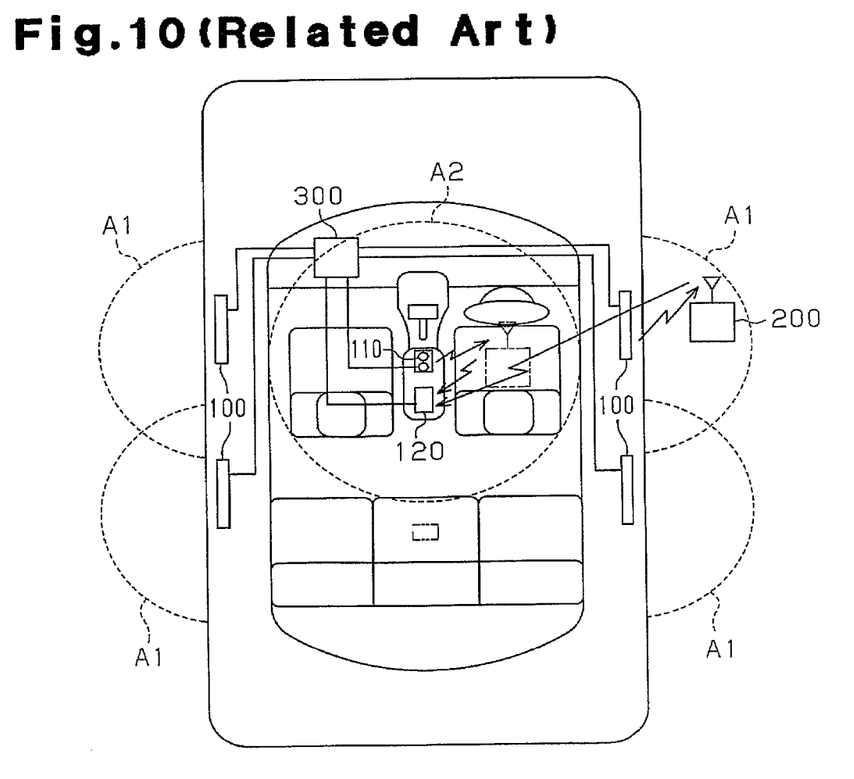
FIG. 10 is a plan view showing an electronic key system of the prior art.

FIG. 10 shows a controller 300 connected to passenger compartment exterior transmitters 100 and a passenger compartment interior receiver 120. The controller 300 controls the locking and unlocking of vehicle doors and enables the starting of the engine. A portable device 200 performs wireless communication with the passenger compartment exterior transmitters 100 and the passenger compartment interior receiver 120. The passenger compartment exterior transmitters 100 are each arranged in the handle of one of the vehicle doors. Each of the passenger compartment exterior transmitters 100 transmits a request signal to a vehicle exterior communication area A1, which is formed near the corresponding vehicle door. When the portable device 200, which is carried by the driver, enters the vehicle exterior communication areas A1, the portable device 200 receives the request signal from the corresponding passenger compartment exterior transmitter 100. In response to the request signal, the portable device 200 transmits a response signal. When the response signal, which is transmitted from the portable device 200, is received by the passenger compartment interior receiver 120, the passenger compartment interior receiver 120 provides the controller 300 with a signal indicating receipt of the response signal.

A passenger compartment interior transmitter 110 is arranged in the passenger compartment to transmit a request signal to a vehicle interior communication area A2. When the portable device 200, which is carried by the driver, enters the vehicle interior communication area A2, the portable device 200 transmits a response signal in response to the request signal from the passenger compartment interior transmitter 110. When the response signal is received by the passenger compartment interior receiver 120, the passenger compartment interior receiver 120 provides the controller 300 with a signal indicating receipt of the response signal.

The controller 300 determines whether the driver (portable device 200) is located in the vehicle exterior communication areas A1 or the vehicle interior communication area A2 based on whether or not the signal indicating receipt of the response signal is provided from the passenger compartment interior receiver 120. For example, when determining that the driver is in the vehicle exterior communication areas A1, the controller 300 unlocks the vehicle doors. Further, for example, when determining that the driver is in the vehicle interior communication area A2, the controller 300 enables the starting of the engine.

Figure 11:
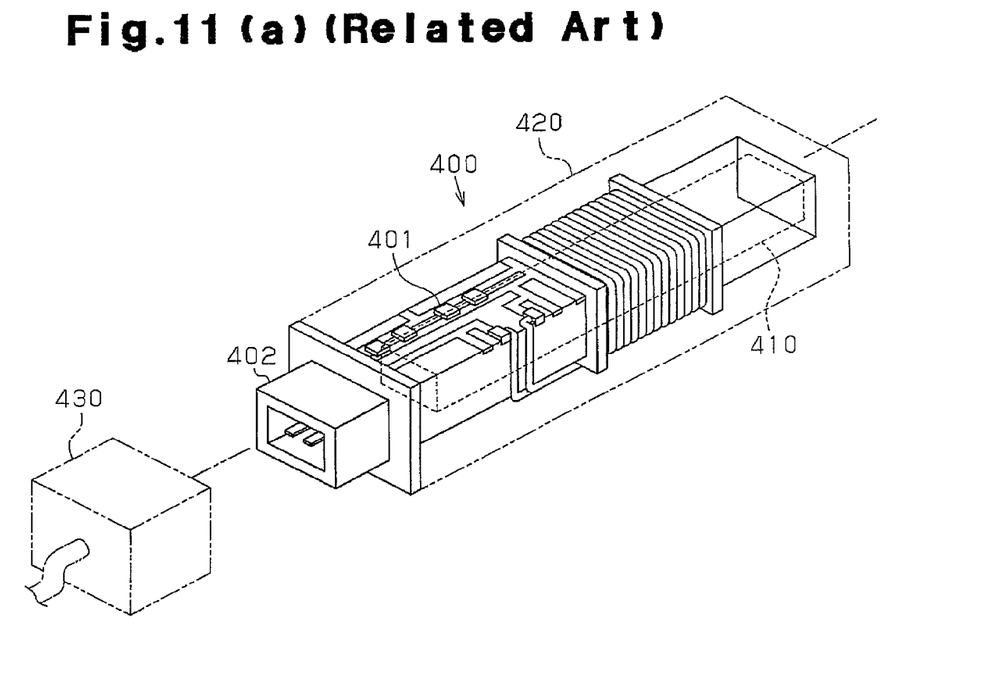
FIGS. 11(a) and 11(b) are perspective views showing a passenger compartment antenna device used in the electronic key system of FIG. 10.

The passenger compartment interior transmitter 110 includes a passenger compartment antenna device, which transmits the request signal. FIGS. 11(a) and 11(b) show a passenger compartment antenna device, which is described in Japanese Laid-Open Patent Publication No. 2006-180436.

The passenger compartment antenna device includes a bobbin 400, which includes a circuit unit 401, and a core 410, which is arranged in the bobbin 400 to function as an antenna. The bobbin 400 includes a connector plug 402, which is connected to a connector socket 430 arranged in the vehicle. The circuit unit 401 and the core 410 of the bobbin 400 are embedded and enclosed in a mold resin block 420 (as shown by double-dotted line). The mold resin block 420 protects the circuit unit 401 and the core 410 from moisture.

SUMMARY OF THE INVENTION

Figure 12:
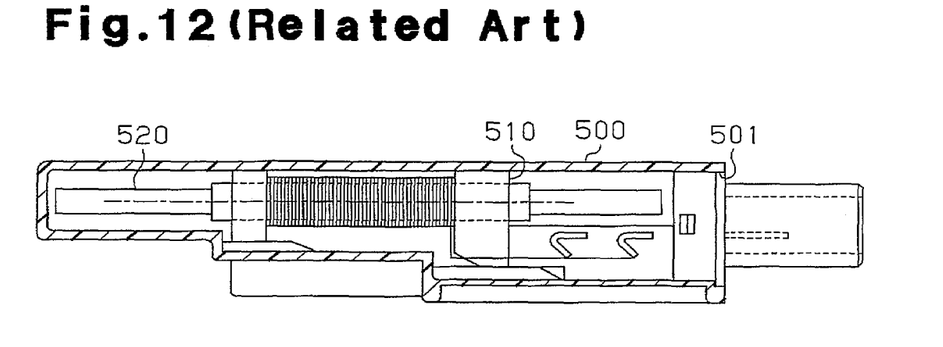
FIG. 12 is a cross-sectional diagram showing a further passenger compartment antenna device used in the prior art.

FIG. 12 shows another passenger compartment antenna device that uses a resin case 500 to cover a bobbin 510. A core 520 is formed integrally with the bobbin 510. The bobbin 510 is inserted into an opening 501 of the case 500. Projections (not shown) are formed on the inner wall surface of the case 500. When the bobbin 510 is inserted into the case 500, the outer wall surface of the bobbin 510 squeezes and deforms the projections of the inner wall surface of the case 500. This prevents the bobbin 510 from becoming loose in the case 500.

The case 500 functioning as an outer member and the bobbin 510 functioning as an inner member are normally required to have different properties. Thus, the case 500 and the bobbin 510 may be formed from different resin materials in accordance with the required properties. Resin materials for forming the case 500 is required to resist external impact and breakage. A resin material for forming the bobbin 510 is required to resist breakage during insertion and removal from the case 500. Resin materials for forming the case 500 may be, for example, polyamide resin (PA resin). Resin materials for forming the bobbin 510 may be, for example, polybutylene terephthalate (PBT resin), which is a resin material having a large maximum tensile strength. When forming the case 500 and the bobbin 510 with resin materials having different properties, the inventors of the present invention have found the problems described below.

The inventors of the present invention have conducted operational tests on the passenger compartment antenna device under hot and humid conditions to evaluate environmental factors such as temperature and humidity. In the above-described structure, abnormal noise was produced due to the loose fitting of the case and bobbin during the tests. The inventors of the present invention have studied the main cause of such loose fitting. Under a humid environment, the difference in hygroscopicity between the case and bobbin resulted in greater dimensional changes in the case than in the bobbin. Due to the difference in dimensional changes between the bobbin and the case, a gap forms between the case and bobbin. This results in the loose fitting. If the case and bobbin were to be formed from the same resin material, such a loose fitting would be prevented. However, the case and the bobbing would not be able to obtain the required properties.

Such a problem related to loosening is not limited to a passenger compartment antenna device used in an electronic key system and may occur in any resin member fitting structure, in which a resin member having a small hygroscopic expansion coefficient is fitted into a resin member having a large hygroscopic expansion coefficient.

The present invention obtains the properties required for a case and a bobbin while preventing abnormal noise that would be caused by a loose fit.

One aspect of the present invention is a resin member fitting structure provided with a first resin member having a hollow rectangular tube shape and including at least one inner wall surface. A second resin member includes at least one outer wall surface fitted to the at least one inner wall surface of the first resin member and has a hollow or solid rectangular tube shape. The at least one inner wall surface of the first resin member and the at least one outer wall surface of the second resin member come into contact with each other and define at least one set of fitting surfaces. The second resin member has a hygroscopic expansion coefficient smaller than that of the first resin member. The at least one set of fitting surfaces includes a plurality of recess-projection engagement structures spaced apart from each other in a circumferential direction that intersects a longitudinal direction of the first and second resin members.

A further aspect of the present invention is a passenger compartment antenna device for a vehicle electronic key system. The passenger compartment antenna device includes the resin member fitting structure of the above aspect. A case is formed as the first resin member. A bobbin includes a rectangular tube and is formed as the second resin member. The bobbin is inserted into an opening of the case so that four inner wall surfaces of the case respectively come into contact with four outer wall surfaces of the bobbin so as to form four sets of fitting surfaces. A core is inserted into the tube of the bobbin so as to function as an antenna. The plurality of recess-projection engagement structures includes a plurality of first recess-projection engagement structures formed in a first one of the four sets of fitting surfaces of the case and bobbin and a plurality of second recess-projection engagement structures formed in a second one of the four sets of fitting surfaces that orthogonally intersect the first set of fitting surfaces. The plurality of first recess-projection engagement structures include two through holes spaced apart in the circumferential direction and formed on one of the inner wall surfaces of the case and two projections formed in one of the outer wall surfaces of the bobbin so as to respectively engage with the two through holes. The plurality of second recess-projection engagement structures include two recesses formed in one of the inner wall surfaces of the case so as to form a rectangular projection between the recesses and two projections formed on one of the outer wall surfaces of the second resin member so as to respectively engage with the two recesses of the case. The plurality of first recess-projection engagement structures are arranged in the opening of the case. The plurality of second recess-projection engagement structures are arranged near a middle part of the case in a longitudinal direction of the case.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A resin member fitting structure according to a first embodiment of the present invention will now be discussed with reference to FIGS. 1(a) and 1(b).

Figure 1:
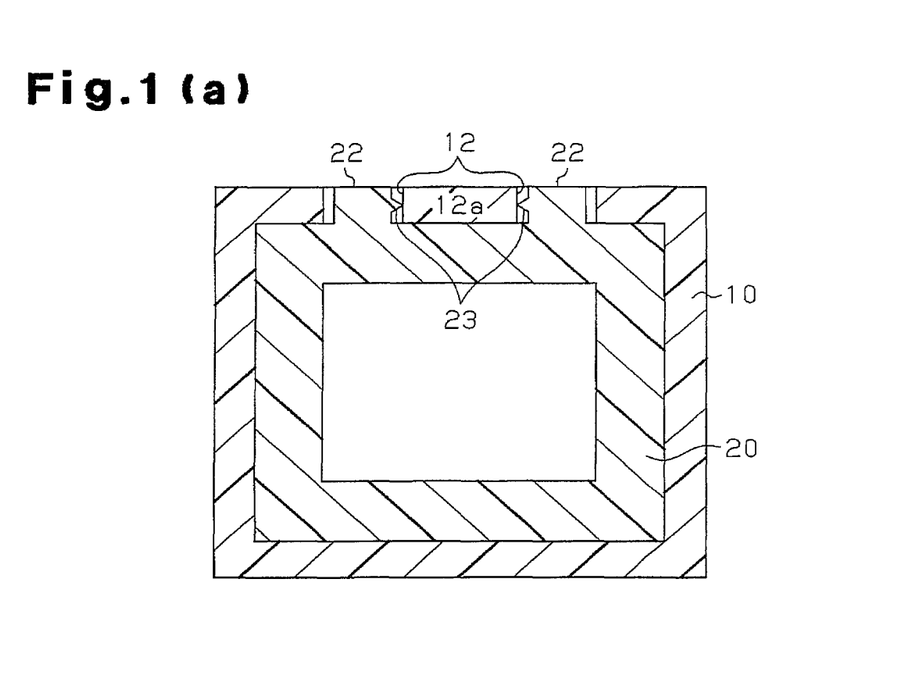
FIGS. 1(a) and 1(b) are cross-sectional views showing a resin member fitting structure according to a first embodiment of the present invention.

FIGS. 1(a) and 1(b) each shows a cross-sectional view of a passenger compartment antenna device including a first resin member 10 (outer member) and a second resin member 20 (inner member). The second resin member 20 has a hygroscopic expansion coefficient smaller than that of the first resin member 10. The first resin member 10 may have a hollow tube shape, such as a hollow rectangular tube shape. The second resin member 20 may have a hollow or solid tube shape, such as a hollow or solid rectangular tube shape. The second resin member 20 is inserted into the first resin member 10. At least one inner wall surface of the first resin member 10 is fitted to at least one outer wall surface of the second resin member 20. In the example of FIG. 1, the four inner wall surfaces of the first resin member 10 are respectively fitted to the four outer wall surfaces of the second resin member 20.

Loose fitting between the resin members 10 is prevented by a plurality of (at least two) recess-projection engagement structures formed as described below.

(A1) A plurality of recesses (e.g., two through holes) 12 are formed in at least one wall surface of the first resin member 10.

(A2) A plurality of projections (e.g., two outward projections) 22 respectively engaged with the through holes 12 of the first resin member 10 project from at least one outer wall surface of the second resin member 20.

The inner wall surface of the first resin member 10 and the outer wall surface of the second resin member 20 are one example of at least one set of fitting surfaces.

In this manner a plurality of recess-projection engagement structures are formed so that part of the first resin member 10, which has a large hygroscopic coefficient, is held between the projections 22 of the second resin member 20, which has a small hygroscopic coefficient.

FIG. 1(a) shows the passenger compartment antenna device in an initial state in which it has not absorbed moisture. FIG. 1(b) shows the passenger compartment antenna device in a state in which it has absorbed moisture. When the humidity increases and the first and second resin members absorb moisture, the first and second resin members expand from the state of FIG. 1(a). For example, a portion 12a between the through holes 12 of the first resin member 10 expands so as to increase the distance between the through holes 12. The second resin member 20 also expands so as to increase the distance between the projections 22. The expansion is greater in the first resin member 10 than in the second resin member 20. However, due to the difference in the hygroscopic coefficients, expansion of the portion 12a between the through holes 12 of the first resin member 10 is hindered by the projections 22 of the second resin member 20. This prevents loose fitting between the first and second resin members 10 and 20 and keeps the fitting in a proper state.

As shown in FIGS. 1(a) and 1(b), a rib 23 may be formed on the surface of each projection 22 facing toward the other projection 22. The ribs 23 allow for a wider dimensional tolerance to be provided for the first and second resin members 10 and 20. In other words, the ribs 23 increase the freedom of design for the resin member fitting structure.

A resin member fitting structure according to a second embodiment of the present invention will now be discussed with reference to FIGS. 2(a) and 2(b) centering on differences from the first embodiment.

The second resin member 20 has a hygroscopic expansion coefficient smaller than that of the first resin member 10. The first resin member 10 may have a hollow tube shape, such as a hollow rectangular tube shape. The second resin member 20 may have a hollow or solid tube shape, such as a hollow or solid rectangular tube shape. The second resin member 20 is inserted into the first resin member 10. At least one inner wall surface of the first resin member 10 is fitted to at least one outer wall surface of the second resin member 20.

A loose fitting between the first resin member 10 and the second resin member 20 is prevented by a recess-projection engagement structure formed as described below.

(B1) Two recesses 14 are formed in the inner wall surface (fitting surface) of the first resin member 10. A projection (inward projection) 13 inwardly projects from the inner surface of the first resin member 10 and extends between the two recesses 14. The inward projection 13 may be a rectangular projection.

(B2) Two projections (outward projections) 24 project from the outer wall surface (fitting surface) of the second resin member 20 and respectively engage the two recesses 14 of the first resin member 10. The two projections 24 are configured to hold the rectangular projection 13 of the first resin member 10 in between.

The inner wall surface of the first resin member 10 and the outer wall surface of the second resin member 20 are one example of at least one set of fitting surfaces.

A plurality of recess-projection engagement structures are formed so as to hold the projection 13, which is formed on the first resin member 10 that has a large hygroscopic expansion coefficient, with the projections 24, which is formed on the second resin member 20 having a small hygroscopic expansion coefficient.

Figure 2A:
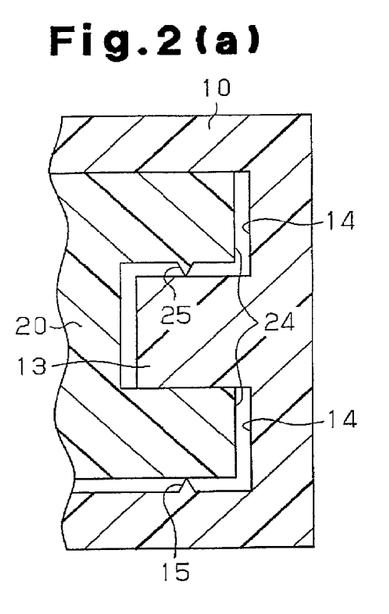
FIGS. 2(a) to 2(c) are cross-sectional views showing a resin member fitting structure according to a second embodiment of the present invention.

FIG. 2(a) shows the passenger compartment antenna device in an initial state in which it has not absorbed moisture. FIG. 2(b) shows the passenger compartment antenna device in a state in which it has absorbed moisture. When the humidity increases and the first and second resin members absorb moisture, the first and second resin members expand from the state of FIG. 2(a). For example, the projection 13 between the recesses 14 of the first resin member 10 expands so as to increase the distance between the recesses 14. The second resin member 20 also expands so as to increase the distance between the projections 24. However, the expansion is greater in the first resin member 10 than in the second resin member 20. Thus, expansion of the projection 13 of the first resin member 10 is hindered by the projections 24 of the second resin member 20. This prevents loose fitting between the first and second resin members 10 and 20.

When the expanded first and second resin members 10 and 20 become dry, the first and second resin members 10 and 20 contract. The contraction is greater in the first resin member 10 than in the second resin member 20. Thus, the first and second resin members 10 and 20 return to the initial state as shown in FIG. 2(a) or the contraction of the first resin member 10 is hindered by the second resin member 20 as shown in FIG. 2(c). This keeps the fitting in a proper state.

Figure 2B:
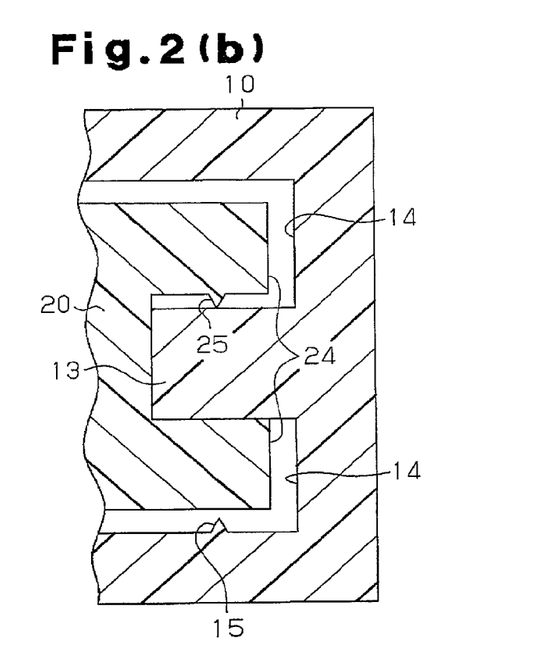
Figure 2C:
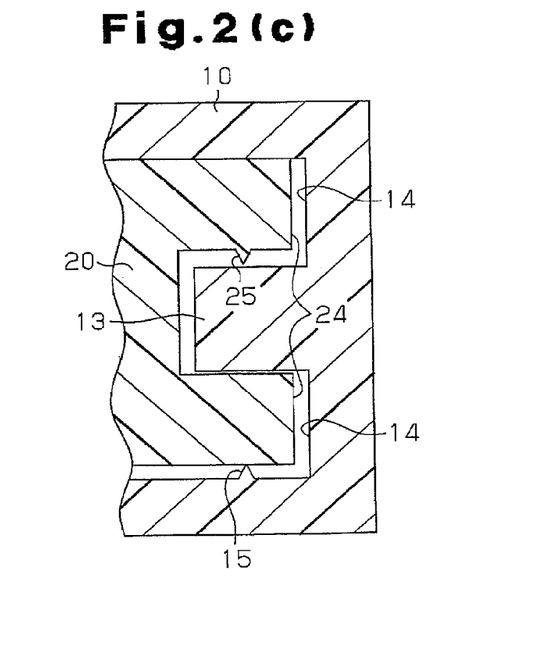

As shown in FIGS. 2(a) to 2(c), ribs 15 and 25 may be formed in the first resin member 10 on a side surface of one the recesses 14 facing toward the corresponding projection 24 and on the second resin member 20 on a side surface of one of the projections 24 facing toward the projection 13. The ribs 15 and 25 allow for a wider dimensional tolerance to be provided for the first and second resin members 10 and 20 and increase the freedom of design for the resin member fitting structure.

A passenger compartment antenna device according to a third embodiment of the present invention will now be discussed with reference to FIG. 3. In the passenger compartment antenna device, a core 60 is formed integrally with a bobbin 50. The bobbin 50 is inserted into an opening 71 of a case 70. The bobbin 50 is formed from polybutylene terephthalate (PBT resin). The case 70 is formed from polyamide resin (PA resin). The hygroscopic expansion coefficient of the bobbin 50 is smaller than the case 70. In other words, the hygroscopic expansion coefficient of the case 70 is greater than that of the bobbin 50.

The bobbin 50 includes a connector plug 51, which is connected to a connector socket arranged in a vehicle. The connector plug 51 is a polygonal housing extending outward from a connector plug surface 52a of the bobbin 50. The connector plug 51 has an open distal end. Connector terminals 51a extend from the connector plug surface 52a in the connector plug 51. When the connector plug 51 is connected to the vehicle connector socket, the connector terminals 51a electrically connect the passenger compartment antenna device to a controller (not shown), which controls the locking and unlocking of the vehicle doors and the starting of the engine.

The bobbin 50 includes a first fitting portion 52, which is formed by a rectangular solid. The outer wall surfaces of the first fitting portion 52 are fitted to the inner wall surfaces of the case 70. The connector plug surface 52a forms part of the first fitting portion 52. Referring to FIG. 4, the first fitting portion 52 includes two projections 52c projecting outward in opposite directions. The two projections 52c are respectively engaged with two through holes 72, which extend through the case 70, to prevent relative displacement of the bobbin 50 and the case 70 in the longitudinal direction. As shown in FIG. 4, a flange 52b extends along the outer wall surfaces of the first fitting portion excluding the upper wall. The flange 52b comes into contact with the open end of the case 70 so as to close the opening 71 (refer to FIG. 3). A circuit unit 53 is formed on the bobbin 50 opposite to the connector plug surface 52a.

The circuit unit 53 is electrically connected to the connector terminals 51a of the connector plug 51 by wires. A coil 58, which excites the core 60, is electrically connected to the circuit unit 53 by terminals 53a. When the controller provides the passenger compartment antenna device with an instruction for transmitting a request signal, the instruction is provided to the circuit unit 53 via the connector terminals 51a. The circuit unit 53 then supplies excitation current to the coil 58 via the terminals 53a to excite the core 60. In this manner, the passenger compartment antenna device transmits a request signal in the passenger compartment.

A rectangular tube portion 54 extends longitudinally from the circuit unit 53. The rectangular tube portion 54 includes a through hole 54a, which is for receiving the core 60. The rectangular tube portion 54 includes a coil winding portion 57 around which the coil 58 is wound. Second and third fitting portions 55 and 56 are defined on longitudinally opposite sides of the coil winding portion 57 and fitted to the inner wall surfaces of the case 70. The second fitting portion 55 is closer to the circuit unit 53, and the third fitting portion 56 is farther from the circuit unit 53. The core 60 is rectangular and formed from a magnetic body of ferrite or the like. The core 60 transmits the request signal when the coil 58 is excited.

Figure 5:
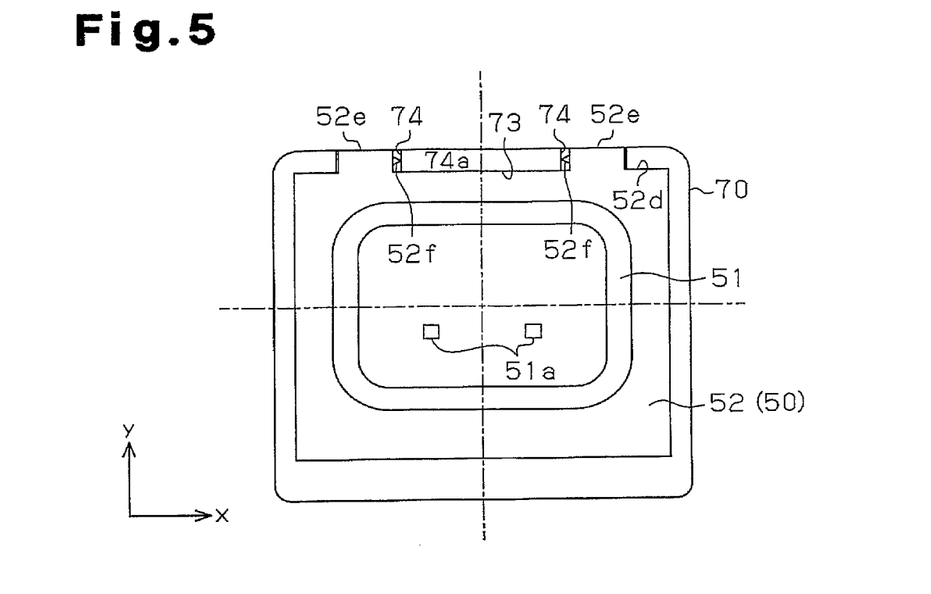
FIG. 5 is a front view showing the passenger compartment antenna device of FIG. 3.
Figure 6:
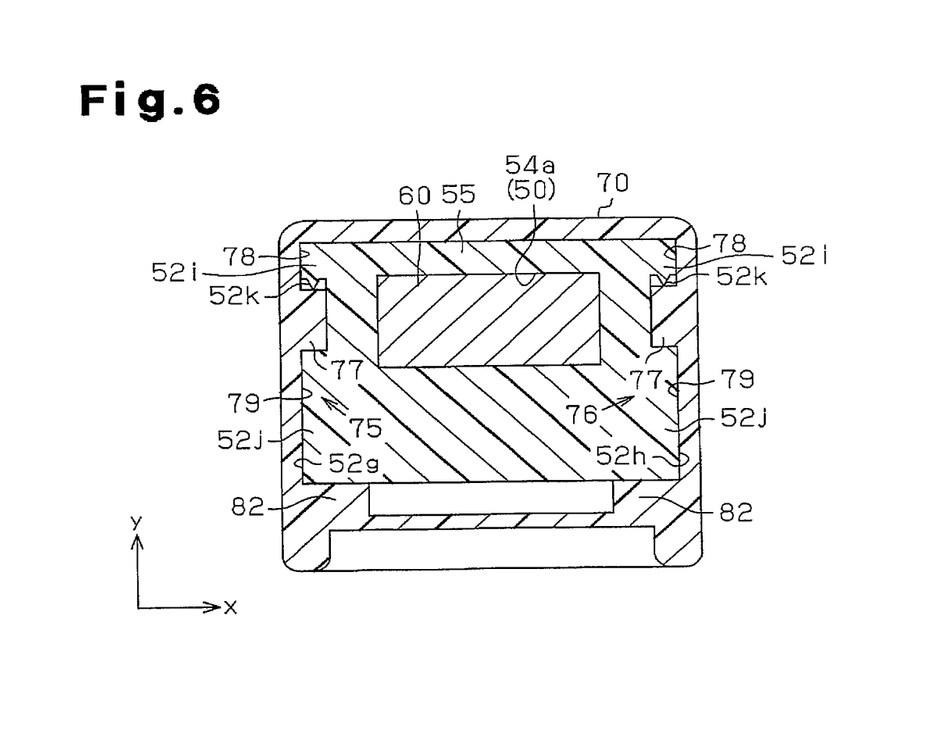
FIG. 6 is a cross-sectional view of the passenger compartment antenna device taken along line 6-6 in FIG. 3.
Figure 7:
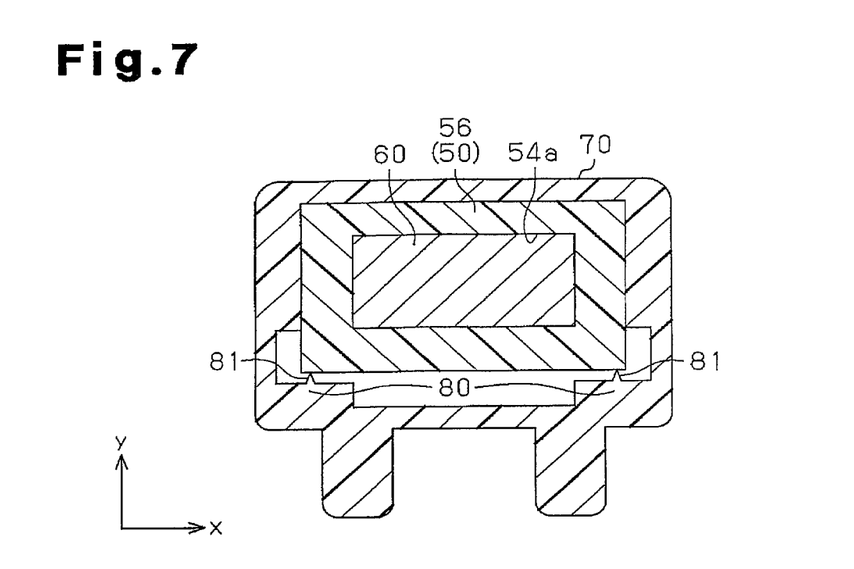
FIG. 7 is a cross-sectional view of the passenger compartment antenna device taken along line 7-7 in FIG. 3.

The passenger compartment antenna device of the third embodiment has the recess-projection engagement structures illustrated in FIGS. 1 and 2 to fit the case 70 and the bobbin 50 with each other. In detail, the case 70 corresponds to the first resin member 10 in the first and second embodiments, and the bobbin 50 corresponds to the second resin member 20 in the first and second embodiments. The recess-projection engagement structures of FIG. 1 are provided on first fitting surfaces, which are defined by the upper fitting surfaces of the case 70 and the bobbin 50. The recess-projection engagement structures of FIG. 2 are provided on second fitting surfaces, which are orthogonal to the first fitting surfaces of the case 70 and the bobbin 50. With reference to FIGS. 5 to 7, the recess-projection engagement structure of the third embodiment will now be described in detail.

FIG. 5 shows the front structure of the passenger compartment antenna device when viewed from the connector plug 51. The recess-projection engagement structure of the passenger compartment antenna device in the third embodiment is formed as described below.

(a1) In the case 70, a plurality of recesses (e.g., two through holes) 74, which are spaced apart from each other in the circumferential direction, are formed in an inner wall surface 73, which functions as a fitting surface.

(a2) In the first fitting portion 52 of the bobbin 50, a plurality of projections (e.g., two outwardly projections) 52e for respectively engaging the through holes 74 of the case 70 are formed on at least one of the outer wall surfaces 52d, which functions as a fitting surface.

The inner wall surface 73 of the case 70 and the outer wall surface of the bobbin 50 are one example of at least one set of fitting surfaces.

The two through holes 74 of the case 70 correspond to the two through holes 12 of the first resin member 10 shown in FIG. 1. The two projections 52e of the bobbin 50 correspond to the two projections 22 of the second resin member 20 shown in FIG. 1. The through holes 74 and the projections 52e are spaced apart from each other in the x direction. The x direction is one example of a circumferential direction that intersects the longitudinal directions of the bobbin 50 and the case 70. Due to the loose fitting prevention effect illustrated in FIG. 1, loose fitting is prevented between the case 70 and the bobbin 50 in the x direction of FIG. 5.

Each projection 52e of the bobbin 50 includes a rib 52f extending along the x axis toward a portion 74a of the case 70 between the through holes 74. The ribs 52f allow for a wider dimensional tolerance to be provided for the case 70 and the first fitting portion 52 of the bobbin 50. The ribs 52f may be squeezed and deformed when the bobbin 50 is fitted to the case 70.

The recess-projection engagement structure of FIG. 2 arranged on the passenger compartment antenna device of the third embodiment will now be discussed with reference to FIG. 6, which is a cross-sectional view of the passenger compartment antenna device taken along line 6-6 in FIG. 3.

As shown in FIG. 6, the recess-projection engagement structure of the passenger compartment antenna device in the third embodiment is formed as described below.

(b1) Two recesses 78 and 79 are formed on each of opposite inner wall surfaces 75 and 76 (fitting surfaces) of the case 70. A rectangular projection 77 is formed between the two recesses 78 and 79. The rectangular projection 7 is located on each of the inner wall surfaces 75 and 76 at a position above the middle part in the y direction.

(b2) Two projections 52i and 52j are formed on each of opposite outer wall surfaces 52g and 52h (fitting surfaces) of the bobbin 50. The two projections 52i and 52j on each of the outer wall surfaces 52g and 52h are respectively engaged with the corresponding two recesses 78 and 79 of the case 70. The rectangular projection 77 of the case 70 is held between the two projections 52i and 52j.

The inner wall surfaces 75 and 76 of the case 70 and the outer wall surfaces 52g and 52h of the bobbin 50 are one example of at least one set of fitting surfaces.

The case 70 and the second fitting portion 55 of the bobbin 50 are fitted together by the plurality of recess-projection engagement structures formed on opposite fitting surfaces. The recesses 78 and 79 of the case 70 correspond to the recesses 14 of the first resin member 10 shown in FIG. 2, and the projections 52i and 52j of the bobbin 50 correspond to the projections 24 of the second resin member 20. The recesses 78 and 79 and the projections 52i and 52j are spaced apart in the y direction. The y direction is one example of the circumferential direction that intersects the longitudinal direction of the bobbin 50 and the case 70 on the inner wall surfaces 75 and 76 and the outer wall surfaces 52g and 52h. Due to the loose fitting prevention effect illustrated in FIG. 2, loose fitting is prevented between the case 70 and the bobbin 50 in the y direction of FIG. 6.

Among the projections 52i and 52j of the bobbins 50, the projections 52i, which are located at positions higher than the projections 52j, may each include a rib 52k that projects toward the corresponding projection 77 in the y direction. The ribs 52k allow for a wider dimensional tolerance to be provided for the case 70 and the second fitting portion 55 of the bobbin 50. Further, the ribs 52k may be squeezed and deformed when the bobbin 50 is fitted into the case 70.

In addition to the recess-projection engagement structures of FIGS. 1 and 2, the passenger compartment antenna device of the third embodiment has the engagement structure formed in the third fitting portion 56.

Figure 3:
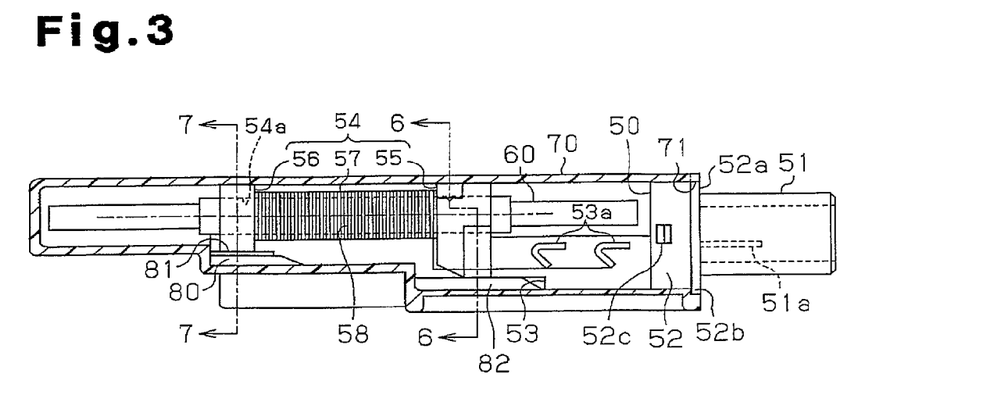
FIG. 3 is a partial cross-sectional view of a passenger compartment antenna device according to a third embodiment of the present invention.
Figure 4:
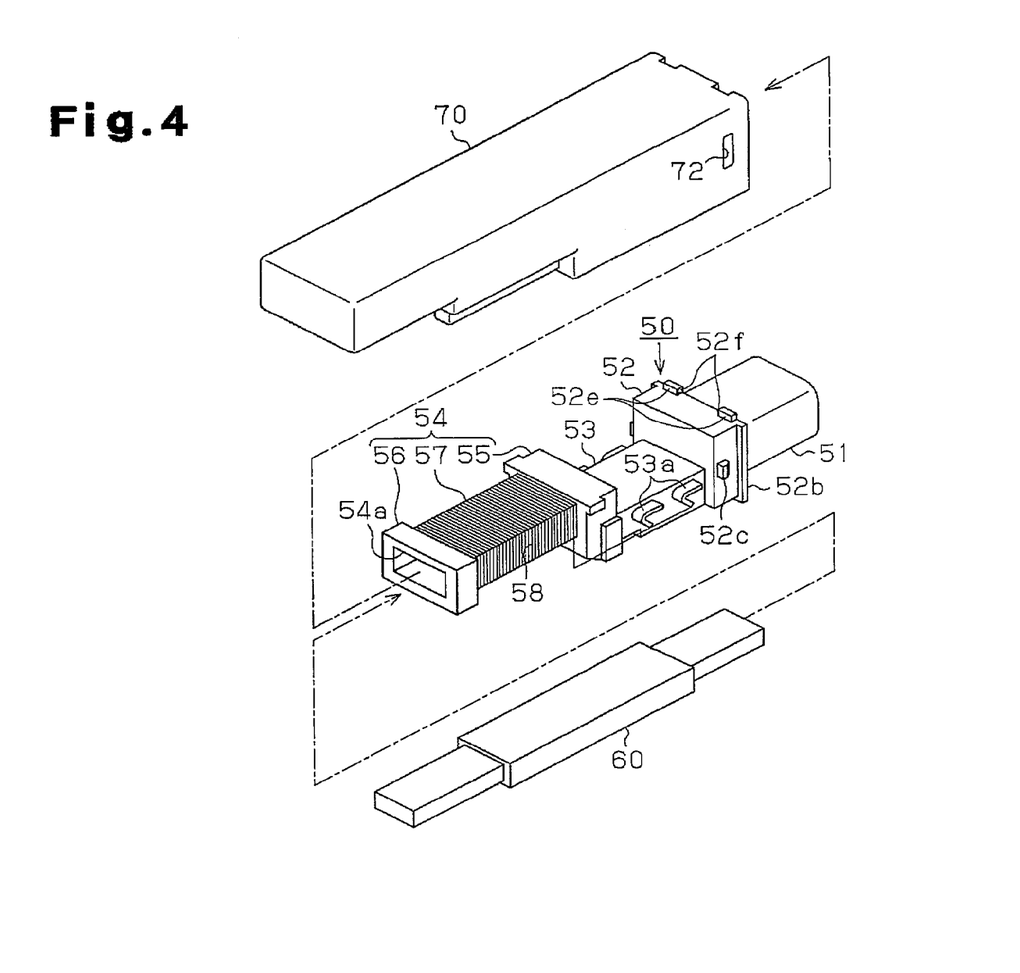
FIG. 4 is an exploded perspective view showing the passenger compartment antenna device of FIG. 3.

FIG. 7 is a cross-sectional view of the passenger compartment antenna device taken along line 7-7 in FIG. 3. As shown in FIG. 7, the inner bottom wall of the case 70 includes step portions 80. The step portions 80 each include a rib 81 projecting in the y direction toward the third fitting portion 56 of the bobbin 50. The ribs 81 may be squeezed and deformed when fitting (inserting) the bobbin 50 into the case 70. The ribs 81 also prevent loose fitting between the case 70 and the bobbin 50 at least during the fitting of the bobbin 50. The ribs 81 especially allow for a wider dimensional tolerance to be provided for the case 70 and the third fitting portion 56.

As described above, the passenger compartment antenna device of the third embodiment has the advantages described below.

(1) The passenger compartment antenna device of the third embodiment employs the recess-projection engagement structures of FIG. 1 in the case 70 and the first fitting portion 52 of the bobbin 50. This prevents loose fitting between the case 70 and the bobbin 50 at least in the opening 71 of the case 70.

(2) The passenger compartment antenna device of the third embodiment employs the recess-projection engagement structures of FIG. 2 in the case 70 and the second fitting portion 55 of the bobbin 50. This prevents loose fitting near the middle part of the case 70 in the longitudinal direction.

(3) The passenger compartment antenna device of the third embodiment employs the recess-projection engagement structure of FIG. 1 in the case 70 and the first fitting surface of the bobbin 50, which is the upper part of the fitting surface of the bobbin 50. Further, the passenger compartment antenna device of the third embodiment employs the recess-projection engagement structures of FIG. 2 in each of the second fitting surfaces, which are orthogonal to the first fitting surface. Thus, loose fitting between the case 70 and the bobbin 50, which would be caused by different hygroscopic expansion coefficients, is prevented in two directions, namely, the x direction and the y direction.

(4) In the passenger compartment antenna device of the third embodiment that employs the recess-projection engagement structures of FIG. 1, the ribs 52f project from the projections 52e of the first fitting portion 52 of the bobbin 50 in the x direction toward the portion 74a between the through holes 74 of the case 70. Further, in the passenger compartment antenna device of the third embodiment that employs the recess-projection engagement structure of FIG. 2, the ribs 52k project from the projections 52i, which form the second fitting portion 55 of the bobbin 50 with the projections 52j, toward the projections 77 in the y direction in the second fitting portion 55. In addition, the ribs 81 project from the case 70 toward the third fitting portion 56 of the bobbin 50. Thus, in addition to allowing for a wider dimensional tolerance to be provided for the case 70 and the first and second fitting portions 52 and 55 of the bobbin 50, a wider dimensional tolerance may be allowed for the case 70 and the third fitting portion 56 of the bobbin 50. Since dimensional tolerances for various fitting portions may be widened for the case 70 and the bobbin 50, the freedom of design for the antenna device is improved.

The third embodiment may be modified as described below.

Figure 8:
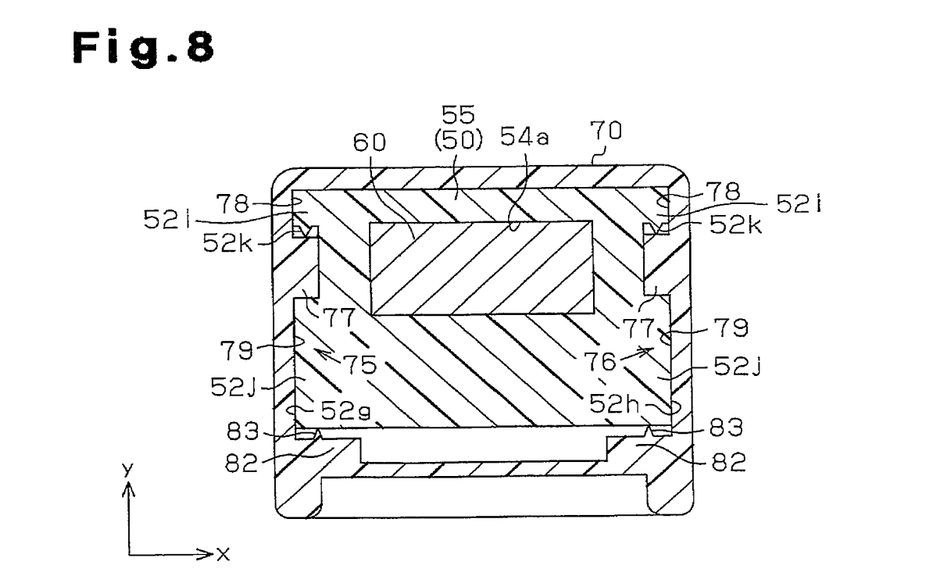
FIG. 8 is a cross-sectional view of a modification of the passenger compartment antenna device of FIG. 3 taken along line 6-6 in FIG. 3

In the third embodiment, the case 70 includes the ribs 81, the first fitting portion 52 of the bobbin 50 includes the ribs 52f, and the second fitting portion 55 of the bobbin 50 includes the ribs 52k. However, the present invention is not limited in such a manner. For example, as shown in FIG. 8, ribs 83 may project from step portions 82, which are formed on the bottom wall of the case 70, in the y direction toward the second fitting portion 55 of the bobbin 50. If the dimensional tolerance between the case 70 and the bobbin 50 can be widened, some or all of the ribs 52f, 52k, and 81 may be eliminated.

Figure 9:
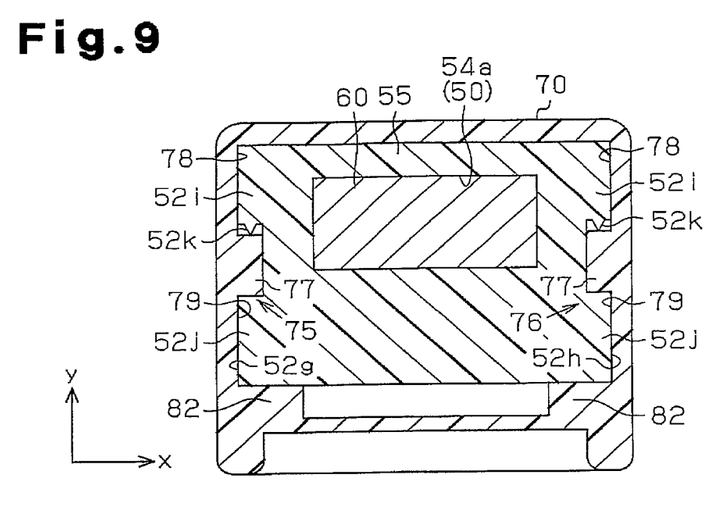
FIG. 9 is a cross-sectional view of a modification of the passenger compartment antenna device of FIG. 3 taken along line 6-6 in FIG. 3

In the third embodiment, the projections 7 of the case 70 are formed on the inner wall surfaces 75 and 76 slightly above the middle of the walls 75 and 76 in the y direction. As shown in FIG. 9, the projections 77 may be formed at the middle part of the inner wall surfaces 75 and 76 in the y direction. By forming the projections 77 at this position, the recesses 78 and 79 are formed symmetrically on opposite sides of the projection 88 with respect to the y direction. In the same manner, the projections 52i and 52j of the bobbin 50 are formed symmetrically on opposite sides of the projection 77. That is, the two recess-projection engagement structures that includes the recesses 78 and 79 and the projections 52i and 52j are formed symmetrically on opposite sides of the projections 77. In this case, the case 70 and the bobbin 50 uniformly expand in the circumferential direction during hygroscopic expansion. Thus, non-uniform stress is not concentrated in the case 70 and the bobbin 50.

There may be two or more of each of the recess-projection engagement structures illustrated in FIGS. 1 and 2.

In the third embodiment, the recess-projection engagement structures illustrated in FIGS. 1 and 2 are arranged on the case 70 and the first and second fitting surfaces of the bobbin 50. The recess-projection engagement structures of FIGS. 1 and 2 may be provided at any location. Examples are described below.

(a) The first fitting surfaces may employ the recess-projection engagement structures of FIG. 2, and the second fitting surfaces may employ the recess-projection engagement structures of FIG. 1.

(b) The first and second fitting surfaces may each employ the recess-projection engagement structures of FIG. 1.

(c) The first and second fitting surfaces may each employ the recess-projection engagement structures of FIG. 2.

(d) The recess-projection engagement structures of FIG. 1 or FIG. 2 may be employed by only the first fitting surfaces, and the second fitting surfaces may be free from any recess-projection engagement structures.

(e) The recess-projection engagement structure of FIG. 1 or FIG. 2 may be employed by only the second fitting surfaces, and the first fitting surfaces may be free from any recess-projection engagement structures.

(f) The recess-projection engagement structures of FIG. 1 or FIG. 2 may be employed on third fitting surfaces, which are defined by lower parts of fitting surfaces of the case 70 and the bobbin 50.

In the passenger compartment antenna device of the third embodiment, the case 70 is formed from PA resin, and the bobbin 50 is formed from PBT resin. However, the materials of the case 70 and the bobbin 50 are not limited to PA resin and PBT resin. When the hygroscopic expansion coefficient of the first resin member 10 or the case 70 is represented by $\alpha$, and the hygroscopic expansion coefficient of the second resin member 20 or bobbin 50 is represented by $\beta$, the present invention may be applied as long as the expansion coefficients $\alpha$ and $\beta$ satisfy the relationship of "$\alpha > \beta$."

The fitting structure of the present invention is employed in a passenger compartment antenna device of a vehicle wireless device, such as an electronic key system, but may also be applied to any type of an antenna device other than a passenger compartment antenna device.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A passenger compartment antenna device for a vehicle electronic key system, the passenger compartment antenna device comprising:
   a first resin member having a hollow rectangular tube shape including at least two inner wall surfaces and comprising a polyamide resin that exhibits a first hygroscopic expansion coefficient, wherein the first resin member forms a case for the passenger compartment antenna; and
   a second resin member having a rectangular tube shape including at least two outer wall surfaces and comprising a polybutylene terephthalate resin that exhibits a second hygroscopic expansion coefficient;
   wherein the first hygroscopic expansion coefficient is larger than the second hygroscopic expansion coefficient when measured under usage environment conditions of the passenger compartment antenna device, and
   wherein the at least two inner wall surfaces of the first resin member and the at least two outer wall surfaces of the second resin member come into contact with each other and define at least a first fitting surface and a second fitting surface; and
   wherein at least the first and second fitting surfaces include a plurality of recess-projection engagement structures spaced apart from each other in a circumferential direction that is orthogonal to the longitudinal direction of the first and second resin members, and
   wherein the first recess-projection engagement structure is arranged near a middle portion of the passenger compartment antenna device and comprises at least two through holes disposed in at least one of the walls of the first resin member and at least two projections disposed on at least one of the outer wall surfaces of the second resin member so as to respectively engage with the at least two through holes; and
   wherein the second recess-projection engagement structure is disposed on the first and second resin members and comprises at least two recesses disposed at an end of at least one of the walls of the first resin member so as to form a rectangular projection between the recesses and at least two projections formed on at least one of the outer wall surfaces of the second resin member so as to respectively engage with the at least two recesses of the first resin member.

2. The passenger compartment antenna device according to claim 1, further comprising:
   a rib projecting in the circumferential direction from an inner surface of the at least two through holes or from an outer surface of the at least two projections.

3. A passenger compartment antenna device for a vehicle electronic key system, the passenger compartment antenna device comprising:
   a first resin member having a hollow rectangular tube shape including at least two inner wall surfaces and comprising a polyamide resin that exhibits a first hygroscopic expansion coefficient, wherein the first resin member forms a case for the passenger compartment antenna; and
   a second resin member having a rectangular tube shape including at least two outer wall surfaces and comprising a resin that exhibits a second hygroscopic expansion coefficient;
   wherein the first hygroscopic expansion coefficient is larger than the second hygroscopic expansion coefficient when measured under usage environment conditions of the passenger compartment antenna device, and
   wherein the at least two inner wall surfaces of the first resin member and the at least two outer wall surfaces of the second resin member come into contact with each other and define at least a first fitting surface and a second fitting surface; and
   wherein at least the first and second fitting surfaces include a plurality of recess-projection engagement structures spaced apart from each other in a circumferential direction that is orthogonal to the longitudinal direction of the first and second resin members, and
   wherein the first recess-projection engagement structure is arranged near a middle portion of the passenger compartment antenna device and comprises at least two through holes disposed in at least one of the walls of the first resin member and at least two projections disposed on at least one of the outer wall surfaces of the second resin member so as to respectively engage with the at least two through holes; and
   wherein the second recess-projection engagement structure is disposed on the first and second resin members and comprises at least two recesses disposed at an end of at least one of the walls of the first resin member so as to form a rectangular projection between the recesses and at least two projections formed on at least one of the outer wall surfaces of the second resin member so as to respectively engage with the at least two recesses of the first resin member.

4. An antenna device for a vehicle electronic key system, the antenna device comprising:
   a first resin member having a hollow rectangular tube shape including at least two inner wall surfaces and comprising a polyamide resin that exhibits a first hygroscopic expansion coefficient, wherein the first resin member forms a case for the antenna; and
   a second resin member having a rectangular tube shape including at least two outer wall surfaces and comprising a polybutylene terephthalate resin that exhibits a second hygroscopic expansion coefficient;
   wherein the first hygroscopic expansion coefficient is larger than the second hygroscopic expansion coefficient when measured under usage environment conditions of the vehicle electronic key system, and
   wherein the at least two inner wall surfaces of the first resin member and the at least two outer wall surfaces of the second resin member come into contact with each other and define at least a first fitting surface and a second fitting surface; and
   wherein at least the first and second fitting surfaces include a plurality of recess-projection engagement structures spaced apart from each other in a circumferential direction that is orthogonal to the longitudinal direction of the first and second resin members, and
   wherein the first recess-projection engagement structure is arranged near a middle portion of the antenna device and comprises at least two through holes disposed in at least one of the walls of the first resin member and at least two projections disposed on at least one of the outer wall surfaces of the second resin member so as to respectively engage with the at least two through holes; and
   wherein the second recess-projection engagement structure is disposed on the first and second resin members and comprises at least two recesses disposed at an end of at least one of the walls of the first resin member so as to form a rectangular projection between the recesses and at least two projections formed on at least one of the outer wall surfaces of the second resin member so as to respectively engage with the at least two recesses of the first resin member.

* * * * *